US006766379B2

(12) United States Patent
Bhatla

(10) Patent No.: US 6,766,379 B2
(45) Date of Patent: Jul. 20, 2004

(54) PROVIDING MULTIPLE UNICAST RESOURCE RECORDS TO DOMAIN NAME SERVERS FOR INDICATION OF SIMULTANEOUSLY SENDING MULTIPLE UNICAST MESSAGES TO DIFFERENT IP DESTINATIONS THAT SHARE A COMMON DOMAIN NAME

(75) Inventor: Mukesh Bhatla, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/233,765

(22) Filed: Sep. 3, 2002

(65) Prior Publication Data

US 2004/0044788 A1 Mar. 4, 2004

(51) Int. Cl.[7] .......................... G06F 15/173; G06F 15/16
(52) U.S. Cl. .......................... 709/238; 709/227; 709/245
(58) Field of Search ................................. 709/238, 227, 709/223, 245

(56) References Cited

U.S. PATENT DOCUMENTS 6,601,101 B1 * 7/2003 Lee et al. .................... 709/227

2003/0172145 A1 * 9/2003 Nguyen ...................... 709/223

OTHER PUBLICATIONS

Mockapetris, "RFC 1034", Network Working Group, Nov., 1987.*

TadG, Email response, Google's Newsgroups: alt.hacking, Nov. 17, 1998.*

* cited by examiner

Primary Examiner—Wen-Tai Lin
(74) Attorney, Agent, or Firm—Fitch, Even, Tabin & Flannery

(57) ABSTRACT

An arrangement (10) is provided for requesting and receiving consistent treatment for hosts having separate IP addresses but a common domain name. The desired treatment is provided utilizing DNS databases having new MURR-type resource records (107, 1000, 10002, 10004). The present invention can also be readily employed in wired communication systems, as well as intranet or local area network systems employing IP addressing, where multiple hosts having the same domain name need to get the same treatment from a client application, which communicates using the IP addresses resolved by a DNS server.

18 Claims, 10 Drawing Sheets

HEADER

QR (RESPONSE FLAG IS SET)
OPCODE=0 (A STANDARD QUERY)
QDCOUNT=1
ANCOUNT=3
NSCOUNT=0
ARCOUNT=0

QUESTION

QNAME="jqpublic.mot.com"
QTYPE=MURR
QCLASS=IN

ANSWER(3 MURR RESOURCE RECORDS AS SHOWN IN THE DATABASE)

| | | | | | |
|---|---|---|---|---|---|
| jqpublic.mot.com | MURR RECORD | INTERNET | 86400 | 4 | 124.123.123.123 |
| jqpublic.mot.com | MURR RECORD | INTERNET | 86400 | 4 | 124.123.123.123 |
| jqpublic.mot.com | MURR RECORD | INTERNET | 86400 | 4 | 124.123.123.123 |

AUTHORITY

NULL

ADDITIONAL

NULL

*FIG. 7*

| | |
|---|---|
| HEADER | QR (QUERY FLAG IS SET)<br>OPCODE=0 (A STANDARD QUERY)<br>QDCOUNT=1<br>ANCOUNT=0<br>NSCOUNT=0<br>ARCOUNT=0 |
| QUESTION | QNAME="jqpublic.mot.com"<br>QTYPE=A RECORD<br>QCLASS=IN |
| ANSWER | NULL |
| AUTHORITY | NULL |
| ADDITIONAL | NULL |

*FIG. 9*

| |
|---|
| HEADER <br>     QR (RESPONSE FLAG IS SET) <br>     OPCODE=0 (A STANDARD QUERY) <br>     QDCOUNT=1 <br>     ANCOUNT=3 <br>     NSCOUNT=0 <br>     ARCOUNT=0 |
| QUESTION <br>     QNAME="jqpublic.mot.com" <br>     QTYPE=A RECORD <br>     QCLASS=IN |
| ANSWER(1A RESOURCE RECORD AS SHOWN IN THE DATABASE) <br> jqpublic.mot.com   A RECORD   INTERNET   86400   4   124.123.123.123 |
| AUTHORITY <br>     NULL |
| ANSWER(1A RESOURCE RECORD AS SHOWN IN THE DATABASE) <br> jqpublic.mot.com   MURR RECORD   INTERNET   86400   4   124.123.123.123 <br> jqpublic.mot.com   MURR RECORD   INTERNET   86400   4   134.87.98.70 <br> jqpublic.mot.com   MURR RECORD   INTERNET   86400   4   134.88.105.98 |

*FIG. 10*

PROVIDING MULTIPLE UNICAST RESOURCE RECORDS TO DOMAIN NAME SERVERS FOR INDICATION OF SIMULTANEOUSLY SENDING MULTIPLE UNICAST MESSAGES TO DIFFERENT IP DESTINATIONS THAT SHARE A COMMON DOMAIN NAME

BACKGROUND OF THE INVENTION

1. Field of the Invention

The present invention pertains to the Multiple Unicast of Data over a network where multiple hosts have the same domain name and individual Internet Protocol (IP) addresses.

2. Description of the Related Art

The possibility of having multiple IP addresses mapped to the same domain name is common. For example, multi-homed IP hosts are present in a system or where the system includes multiple servers having the same domain name and in both these cases a client application needs to approach only one of those IP hosts. Further, the penetration of mobile hosts and personal devices identified on the Internet by the user's Network Access Identifier (NAI) may create a scenario where multiple devices may have the same domain name but different IP addresses and all of those devices may need to get the service or data from the application which identifies them only by their host name.

BRIEF DESCRIPTION OF THE DRAWINGS

FIG. 7 is a schematic diagram of a MURR-type resource response;

FIG. 9 is a schematic diagram of an A-type resource record query,

FIG. 10 is a schematic diagram of an A-type resource record response;

DETAILED DESCRIPTION OF THE PREFERRED EMBODIMENTS

The present invention proposes to add new resources for networks utilizing Internet Protocol (IP) and Domain Name Servers (DNS) where multiple hosts have different IP addresses, but a common domain name. The present invention, in one aspect, makes available MURR-type resource information which records and makes available addressing information for multiple hosts which are mapped to a common domain name. The acronym MURR stands for Multiple Unicast Resource Record. Preferably, the addressing information is organized according to the Internet Protocol, and is stored in MURR-type resource records which are made available to a client, upon request, utilizing Internet Protocol addressing. MURR-type resource information according to the present invention, discloses to the requesting client the various hosts mapped to a common domain name. The MURR-type resource information may be invoked, that is, recalled and transmitted to a client by reference either to the domain name or to one or more of the clients mapped to the domain name. Preferably, the MURR-type resource information is organized utilizing conventional formats, such as those formats set out in RFC 1035. In other aspects of the present invention, the MURR-type resource information is accessed utilizing conventional query and response formats according to Internet Protocols set out in RFC 1035. Conventional A-type resource records DNS query response may have additional MURR-type resources appended, or a new IP record DNS query, herein referred to as a "MURR record DNS query" may be employed. In additional aspects of the present invention, a MURR-type resource record conveys to the application that data be unicasted to all the hosts whose IP addresses are given by the MURR type resource record. Resources provided according to principles of the present invention allow an efficient broadcasting of information from a client application to the multiple hosts, preferably utilizing conventional multiple unicast treatment. The present invention is directed to systems employing IP addressing, where multiple hosts may be mapped to a common domain name. Examples include, stationary, hard-wired systems as well as stationary and mobile over-the-air systems.

The invention in one aspect, adds to the DNS system a new resource record referred to herein as "Multiple Unicast Resource Record" (MURR). These resources are added for a domain name where the client application retrieving the IP address for the domain name has to provide data (e.g., servicing of PUSH data) to all of the IP addresses (i.e., all of the hosts) retrieved in the multiple MURR-type resources associated with the domain name. In one aspect, the present invention conveys to the client application that all of the hosts having the same domain name and whose IP address is mapped by MURR type record desire Multiple Unicast treatment.

Figure 1:
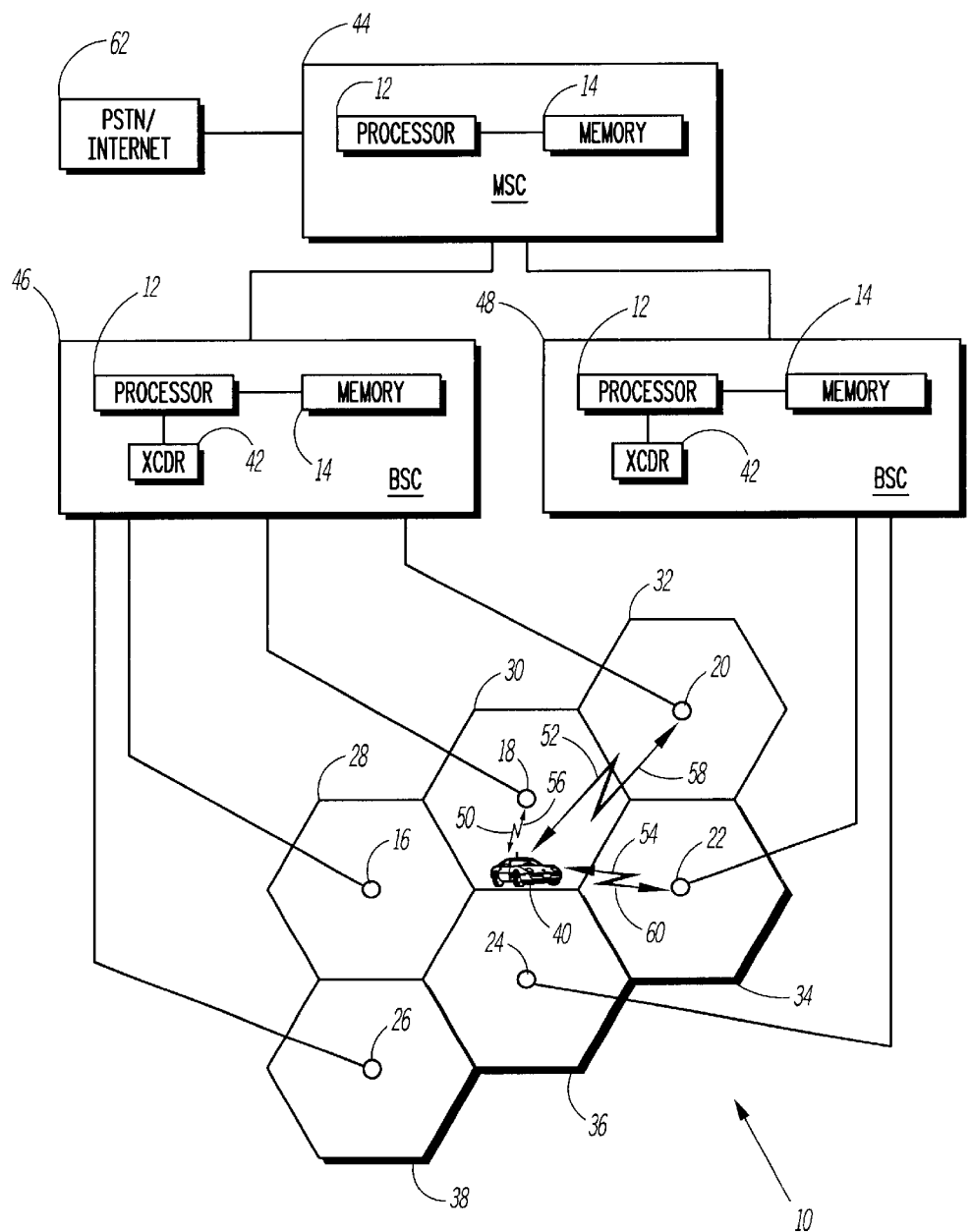
FIG. 1 is a diagram of a wireless communications system in accordance with the present invention.

Referring to the drawings, FIG. 1 illustrates a wireless communication system 10, such as a code division multiple access (CDMA) digital radiotelephone system. Fixed communication units such as Base Transceiver Stations (BTS) 16, 18, 20, 22, 24, and 26, also referred to as cells, communicate with a mobile station 40, also referred to as a mobile unit, operating within area 30. Areas 28, 30, 32 and 38 are served by BTSs 16, 18, 20 and 26 respectively, while areas 34 and 36 are served by BTSs 22 and 24. BTSs 16, 18, 20 and 26 are coupled to a Base Station Controller (BSC) 46, which includes, among other things, a transcoder (XCDR) 42, a processor 12, and a memory 14, and which is in turn coupled to a Mobile Switching Center (MSC) 44, also including a processor 12, and a memory 14. Similarly, BTSs 22 and 24 are coupled to BSC 48 which includes, among other things, a XCDR 42, a processor 12, and a memory 14, and which in turn is also coupled to MSC 44. BSCs 46 and 48 may be referred to as a Base Station Subsystem (BSS). A BSS may also be defined as a single BSC and its associated BTSs. MSC 44 is coupled to the public switched telephone network (PSTN) 62. The PSTN, MSC, and BSS are generically referred to as the infrastructure.

Wireless communication between BTSs 16, 18, 20, 22, 24, and 26 and mobile unit 40 occurs via radio frequency (RF) channels which provide physical paths over which digital communication signals such as voice and data are transmitted. Base-to-mobile unit communications are said to occur on a forward link, while mobile-to-base unit communications are referred to as being on a reverse link.

As shown in FIG. 1, a communication signal 50 has been transmitted on the forward link channel such as a traffic channel, by base station 18 to mobile station 40. Additionally, a communication signal 56 has been transmitted on a reverse link channel such as a traffic channel by mobile station 40 in response to communication signal 50 from base station 18.

Wireless communication system 10 provides a number of logical channels (not shown) that are separated into two categories, traffic channels and signaling channels. The signaling channels are intended for carrying signaling information for broadcast control, mobile unit access control, synchronization, and mobility management. The traffic channels are intended for carrying encoded network data, but also support signaling for mobile station management. The mobile station management signaling on the traffic channel will either steal network data frames or will reduce the throughput of network data frames on the traffic channel, so the frequency of these transmissions is very low.

Figure 2:
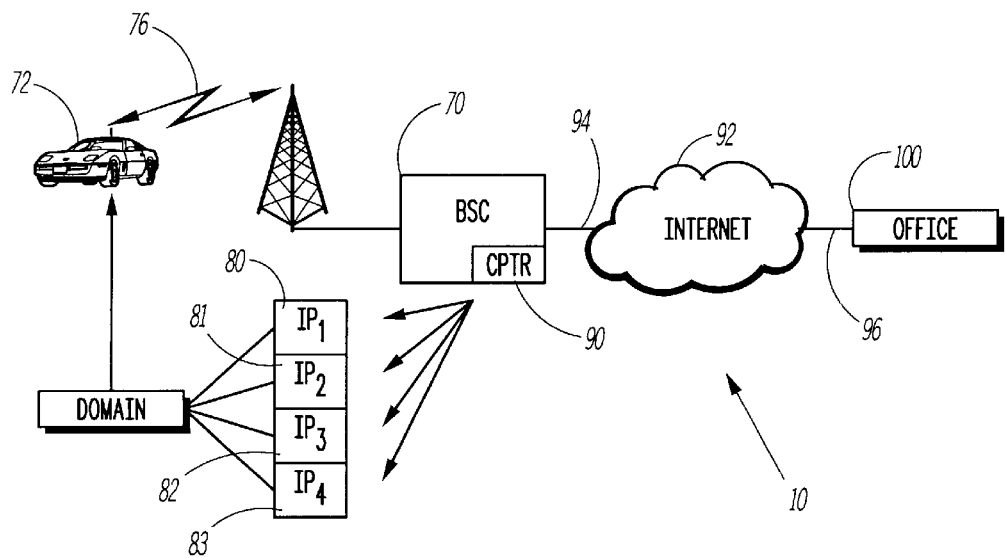
FIG. 2 is a schematic diagram of the wireless communication system of FIG. 1.

The wireless telecommunication system shown in FIG. 1 is also shown in a simplified version, in FIG. 2. Referring now to FIG. 2, a base station controller 70 communicates with a remote mobile site 72 via a wireless communication link generally indicated at 76. In the example illustrated, mobile site 72 includes a number of host devices of the mobile telecommunication type. For example, the hosts may comprise any of the known Personal Communication System (PCS) devices such as facsimile machines, portable computers, portable or fixed data terminals, remote sensing and alarm devices as well as voice-oriented digital communication devices. In the illustrated example, four such devices are indicated by reference numbers 80–83. Each of the devices 81–83 have their own respective Internet Protocol (IP) addresses $IP_1$–$IP_4$. As indicated in FIG. 2, base station controller 70 includes a computer portion 90 which communicates with the Internet generally indicated at 92 via conventional communication links 94, 96 which are either of the fixed or mobile, wired or wireless type. As indicated in FIG. 2, communication is made through the Internet 92 to a remote office 100 which contains a client application seeking communication with devices 80–83.

Figure 3:
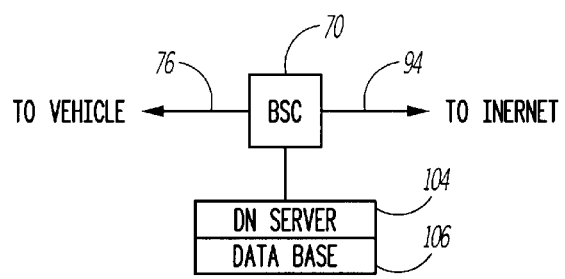
FIG. 3 is a fragmentary schematic diagram of the wireless communication system of FIG. 2.

With additional reference to FIG. 3, base station controller 70 includes or has access to Domain Name Server (DNS) 104 which includes a DNS database 106. The construction and operation of base station controller 70, DNS server 104 and DNS database 106 may be according to any of the conventional types known today.

Figure 4:
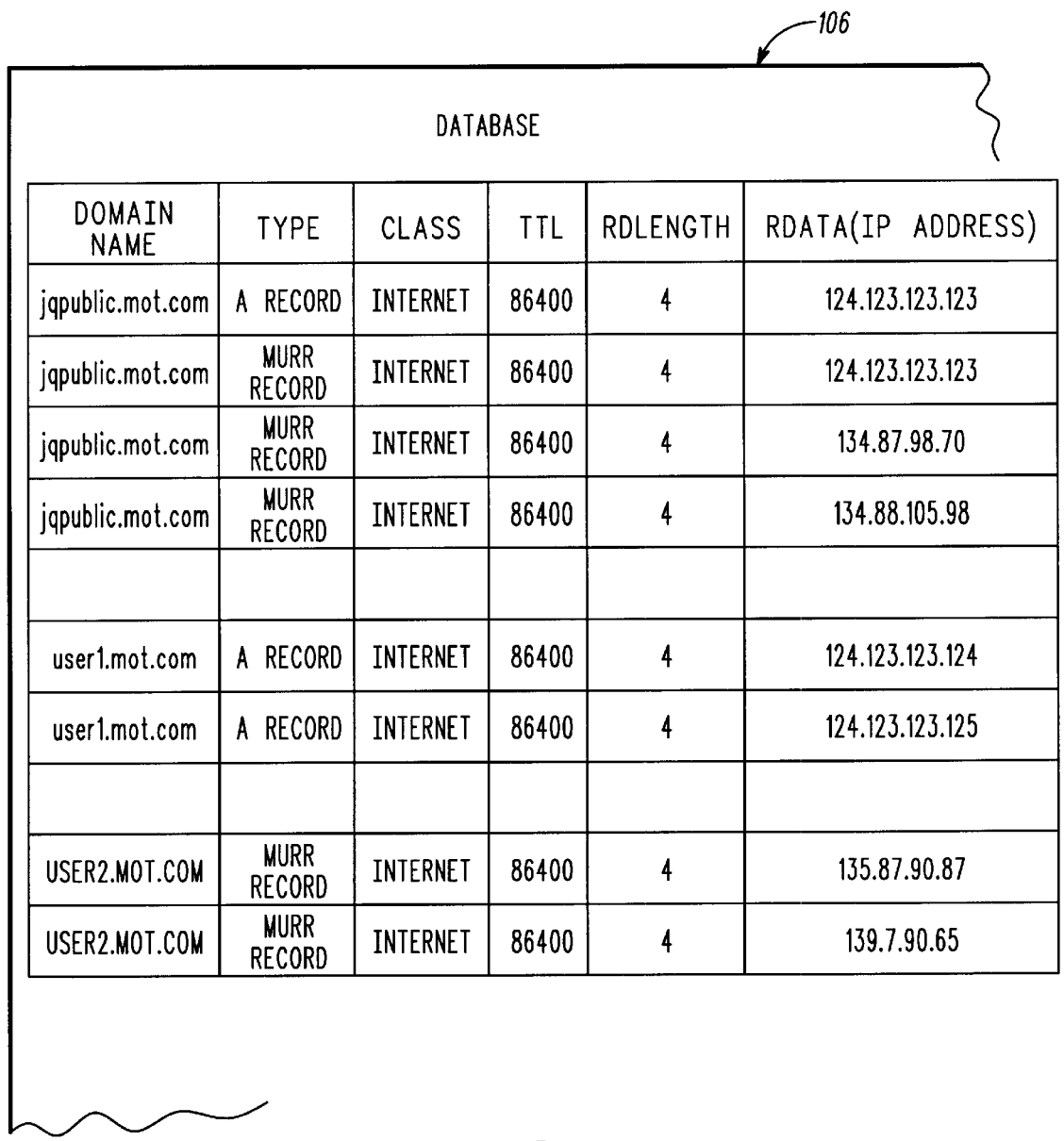
FIG. 4 is a schematic diagram of a DNS database used by the DNS server.

In the wireless telecommunication system 10 illustrated in FIG. 1, client applications coupled to the Public Service Telephone Network (PSTN) 62 are required to broadcast messages to the several devices associated with vehicle 40 (which corresponds to mobile site 72 in FIG. 2). It is assumed that vehicle 40 contains several devices having individual IP addresses mapped to the same domain name. With the present invention MURR type resource record are added to the DNS server database for the hosts which have same domain name and all of them want to get the data sent by the client application. The client application sends either a DNS query for the MURR type resource records to the DNS server or when it sends an A-type query the MURR type resource records can be sent in the additional section of the A-type query response. Referring now to FIG. 4, a database 106 contains a series resource records. MURR and A-records are shown in the figure. These resource records map the domain name to the IP address.

Figure 5:
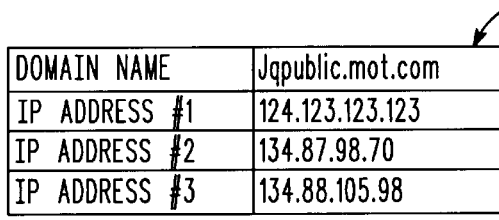
FIG. 5 is a table of MURR-type resource data.

As seen in FIG. 4, a plurality of records are associated with the various domain names. For example, the first grouping of records in database 106 includes an A-type resource record and three MURR-type resource records, which are described in greater detail herein. The database contains RDATA expressed in a grouping of four octets. The multiple octet data for each type comprises an IP address. Database 106 is arranged such that the IP addresses given for a common domain name each identify the addressable location of a host mapped to the common domain name. In the example given, three physical devices have a common domain name. The hosts which want to be part of the group of the hosts which will be sent multiple unicast from the client application will have MURR records. A-record is present for a host and is usage is as described in RFC1035. FIG. 5 provides an inventory for the example system. Table 107 provides an inventory for a single domain name "jqpublic.mot.com". Table 107 is arranged to include three IP addresses listed on the right hand column of the table. The IP addresses in the preferred embodiment provide addressable location or identification for each of the host devices sharing the common domain name indicated in the table. For example, the three IP addresses could relate to a single vehicular installation carrying three independently addressable devices, such as a telephone for over-the-air communication to a cellular system, a fax machine, and a transmitter for broadcasting alarm notifications concerning the status of the vehicle.

A-Type Resource Record Embodiment

As is known, a domain name may have multiple IP addresses mapped to it, with each IP address represented, for example, by an A-type resource record. For example, multiple mobile clients having the same domain name may be provided the same service. These A-type resource records are retrieved by the client application through a Resolver, which resides on the client itself In general, the Resolver may convey the multiple IP addresses retrieved for a domain name or it may convey only one of the IP addresses to the requesting application. A client application, usually located at a site remote from the host, normally communicates with one of the hosts IP addresses, which is retrieved by the application utilizing a domain name query. Applications query the DNS server for these resource records to map the domain name to the IP addresses. The present invention provides treatment such as data access or broadcast for multiple host having different IP addresses but the same domain name, i.e., multiple hosts, which are mapped to the same domain name via multiple IP addresses. With the present invention, a distributed broadcast, communication or transmission is provided for applications, which are directed to a domain name having multiple IP addresses mapped to it. The present invention is especially useful for applications, which must provide the same service (e.g., PUSH data) to all the IP addresses. Multiple hosts having the same domain name may have to be sent the same data by a client application. The same Network Access Identifier (NAI) may be used on various mobile hosts with the domain name of these mobile hosts being similarly derived from the same NAI. All these mobile hosts have to be sent a similar communication such as a transmission of PUSH data. With the present invention, the IP addresses mapped to a common domain name are readily identified for transmission of a multiple unicast message. According to one aspect of the present invention it is preferred that such broadcast messages are sent via conventional multiple unicast broadcast techniques.

The DNS record structure (contained for example in the DNS database 106 indicated in FIGS. 3 and 4) is modified so that all of the MURR-type resources are included in the database and are sent as part of the Additional Section of a reply (see FIG. 10) to a conventionally structured A-type DNS query, set out in FIG. 9.

Preferably, the reply is also of a conventional structure as set out for example is RFC 1035. The MURR-type resource records can be of virtually any type or format. For example, the MURR-type resource records could be of type MURR6 for systems utilizing IPv6 address types. Those skilled in the art will readily appreciate that client applications can easily provide/get the service to/from a single host in the case IP addresses are provided by the A MURR-type resource records.

Figure 8:
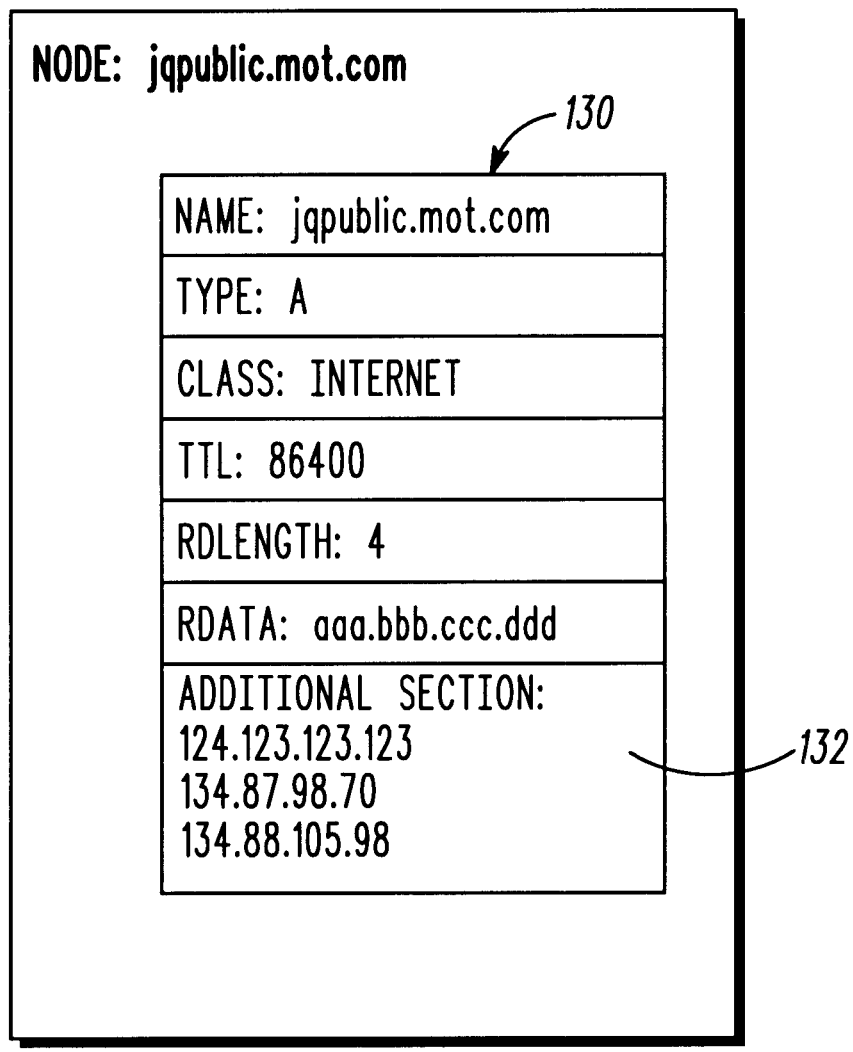
FIG. 8 is a schematic diagram of an A-type resource record.

With reference to FIG. 9, the client application queries the DNS server through the Resolver for resolving the domain names to the IP address. With reference to FIG. 10, when the application sends a query for the A-type resource records, MURR-type resources are sent as part of the "ADDITIONAL SECTION" of the DNS query response. A domain name can have multiple MURR-type resource records stored in the master file of DNS server. The dynamic DNS server update procedures are as specified in the RFC 2136. The present invention provides economy of operation since changes to established A-type resource record treatments (provided in RFL 1035) are not required. Referring to FIG. 5, a schematic indication of database 106 of FIG. 3 is given at 107. Database 107 includes conventional A-type resource records containing MURR-type resources in their additional sections (see FIG. 8). An example of one A-type resource record is given in FIG. 8 and is indicated at 130. Preferably, the A-type resource record is of conventional structure, as indicated above and includes a MURR-type additional section 132 conventionally structured according to RFC 1035. FIG. 9 shows an example of a conventional A-type record resource query and FIG. 10 shows the accompanying A-type record response with MURR-type additional sections, requesting multiple unicast treatment. The client application such as a stock price alert application which wants to send data to a host identified by a domain name, it sends a DNS query to the DNS server. This DNS query could be of two types:

MURR-Type Resource Record Embodiment

Figure 6:
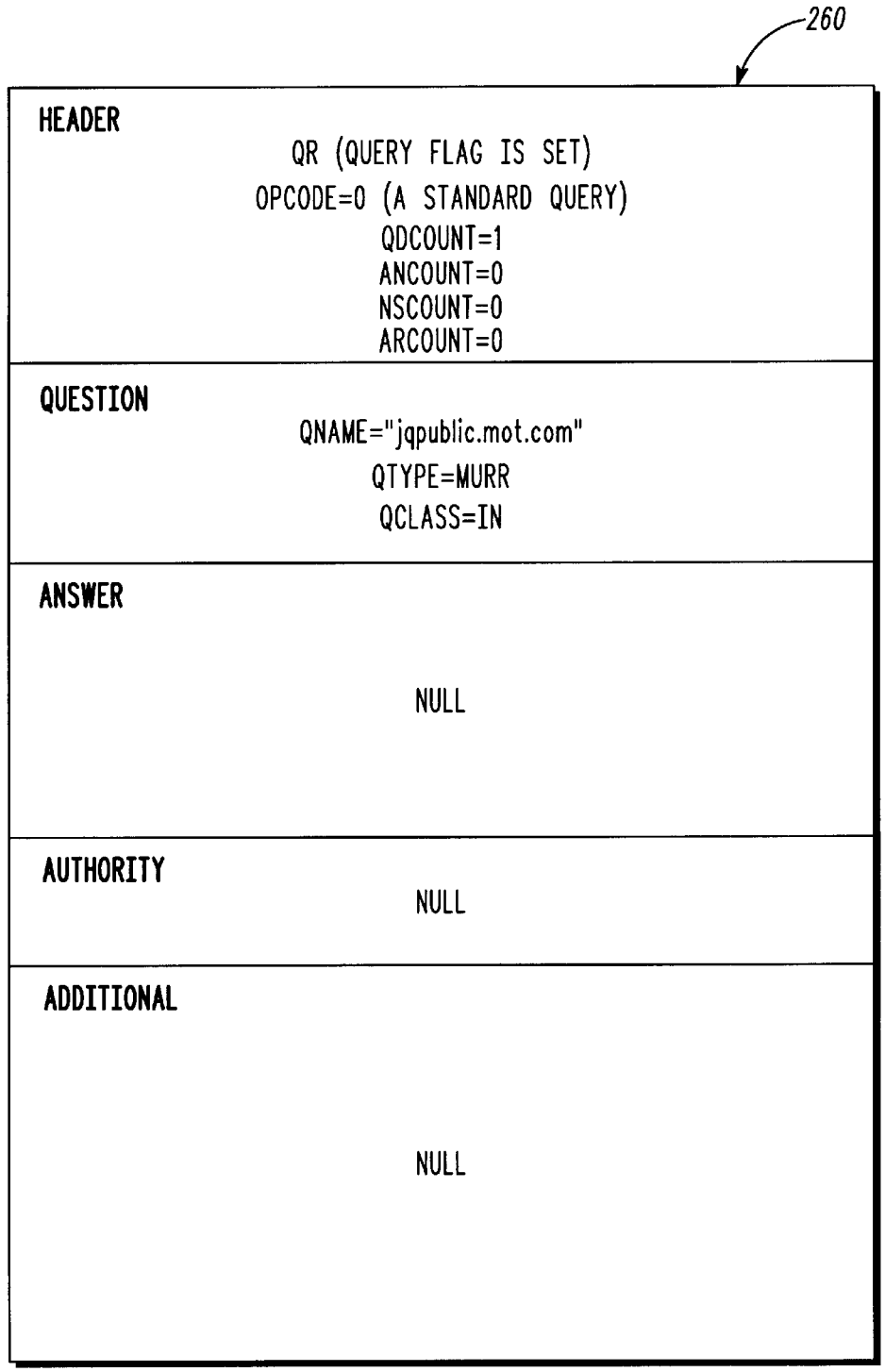
FIG. 6 is a schematic diagram illustrating an exemplar MURR-type resource query.

In a second embodiment, the present invention provides MURR-type resources in newly established MURR-type resource records set up within the DNS server database. Three examples are given in FIG. 11. The client applications are provided with MLJRR DNS query capabilities. FIG. 6 shows an example of a MURR query. Only the fields which are affected or which are relevant to the MURR query are shown. The MURR query is structured according to RFC 1035, Section 4, which sets out guidelines for DNS message structures. As can be seen in FIG. 6, the MURR query includes a header field with a flag to indicate that the message is a standard query, and a question field indicating the domain name.

Referring to FIG. 7, an example of a MURR response is given. Only those fields, which are affected, are shown. Included is a header field indicating that the message is a response to a standard query, a question field indicating the domain name and an answer field containing three listings, for the hosts mapped to the domain name. The structure of the MURR response follows RFC 1035, Section 4, which details DNS message structures. Generally speaking, responses to the MURR DNS queries include identification of all hosts, identified by individual IP addresses, mapped to a common domain name.

Figure 12:
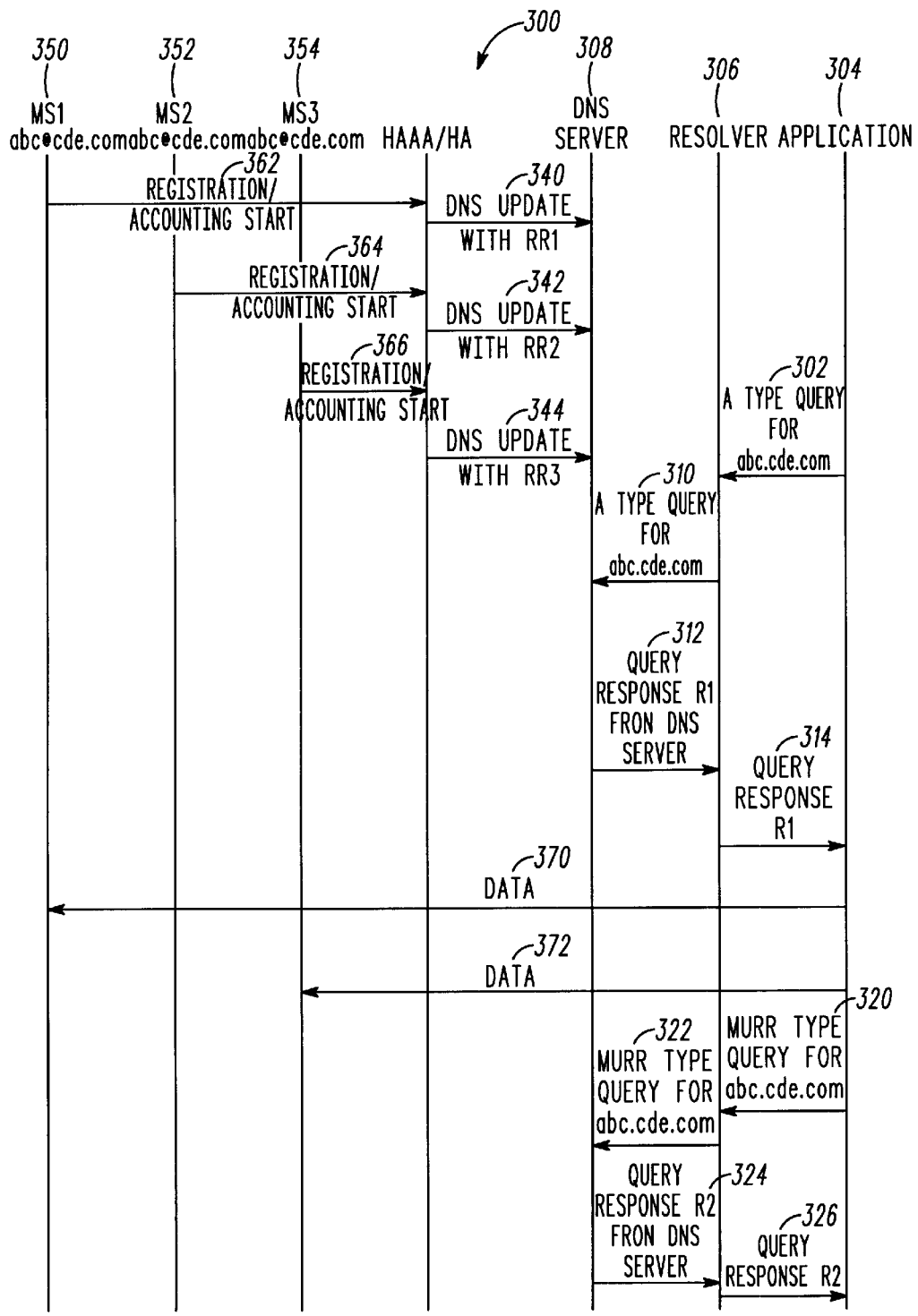
FIG. 12 is a schematic diagram of an overall call set up.

It is generally preferred that the response to the MURR DNS query include instructions that the hosts require multiple unicast treatment by the client application. This request for multiple unicast treatment may be stored in the client application for future reference, or the MURR DNS query may be relied upon to consistently request multiple unicast treatment on subsequent operations. The presence of MURR records in the MURR query response tells the client application that a copy of the data has to be sent to all IP addresses mentioned in the multiple MURRs for the host. Regarding Invoking Multiple Unicast treatment, the host which needs multiple unicast will convey in a conventional manner to the relevant network element (Home agent (HA) or the HAAA) that a MURR type resource record is to be added to DNS database for the MS. As shown in FIG. 12, the mobile stations (MS) MS1 and MS3 desire multiple unicast so a MURR type resource record is added to the DNS database for both these mobiles. Since MS3 didn't desire multiple unicast, an A record was added to the DNS database. MS1 and MS2 will somehow convey to the HA or HAAA that a MURR type resource record be added to the DNS database. When an application does the DNS query for domain name it will get MURR or A resource records, the application will send multiple unicast to the host for which MURR is present in the DNS database. It will not send multiple unicast to the mode which has the A resource record.

Those skilled in the art will readily appreciate that client applications can easily meet the need for multiple unicast to all the IP addresses provided by MURR-type resource records. Having MURR-type resource records in a DNS query response puts a requirement on the Resolver that all the resource records of the type MURR have to be forwarded to the application. In this embodiment, where the Multiple Unicast Resource Record (MURR) is used instead of the A Resource Record to map the domain name to the IP address, the application will have to unicast the data to all the hosts having the same domain name but different IP addresses as specified in the MURR-type resource records for that domain name.

The client application could also send a DNS query for MURR-type resource records. When the DNS responds to the client application with MURR-type resource records, a conventional unicast routine is invoked to unicast the data to all the IP addresses received in the MURR-type resource records.

Figure 11:
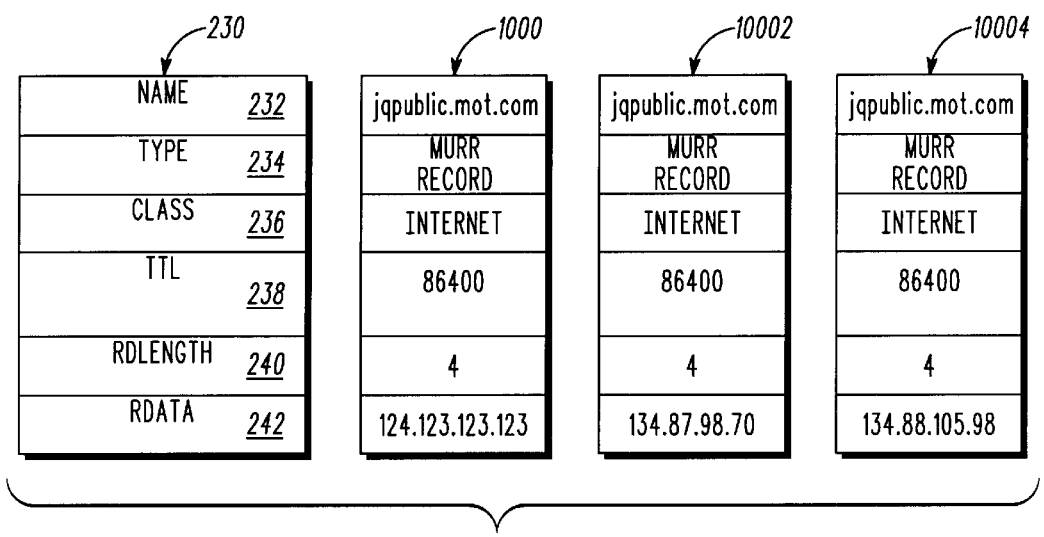
FIG. 11 shows schematic diagrams of MURR-type resource records.

An example structure of three MURR-type resource records 1000, 10002, AND 10004 is shown in FIG. 11. As can be seen, the structure of the MURR includes values for NAME, TYPE, CLASS, TTL, RDLENGTH and RDATA. Preferably the top-level structure of the MURR will be as specified in the RFC 1035 for conventional DNS resource records.

The NAME value 232 has a variable size, and refers to the name of the node (i.e., domain name) to which this MURR belongs.

The TYPE value 234 is comprised of two Octets containing the resource record type, which is MURR. The number for this type has to be assigned by the IANA jurisdiction, all of the Constant numerical values used by specifications of the Internet Engineering Task Force (IETF).

The CLASS value 236 includes two Octets, containing the resource record class code, which is IN(1) in this case.

The TTL value 238 is comprised of a defined bit interval, preferably a 32-bit interval as defined in RFC 1035.

The RDLENGTH, or length of the RDATA field, the RDLENGTH value is comprised of an unsigned 16-bit integer that specifies the length in octets of the RDATA field. The RDATA value 242 has a variable size. Preferably, the RDATA field comprises a 32-bit Internet (IP) address. RDATA for MURR4 is 32-bit IPv4 address for the host whose domain name is specified in the NAME section of the Resource record. RDATA for MURR6 is 128-bit IPv6 address for the host whose domain name is specified in the NAME section of the Resource record.

A domain name can have multiple MURR-type resource records stored in the master file of DNS server. The dynamic DNS server update procedures are as specified in the RFC 2136.

An example of a MURR-type resource query is given in FIG. 6. The query contains a header field indicating at the communication comprises a query and a question field indicating the domain name to which the host addresses are mapped.

A response to the MURR-type resource query is given in FIG. 7 the response contains a header field indicating that the communication is a query response, a question field indicating the domain name to which the IP addresses are mapped, and an answer field containing addressable locations for each of the hosts mapped to the domain name. The addressable locations preferably comprise IP addresses such as 32-bit IPv4 addresses or 128-bit IPv6 addresses for the hosts.

Overall Call Set Up Example

No matter which embodiment is chosen, the present invention enables hosts whose domain name is being resolved to have control over how it wants to get/provide a service. The present invention has found immediate application in the realm of IP wireless communication systems, and is especially useful, for example, for the IP Reachability service for the wireless mobile stations. For the IP Reachability service the host name of the mobile station is derived from the NAI (user@domain) of the user on the mobile. The NAI is converted from user@domain to user.domain to derive the domain name for the mobile. This derived domain is updated along with the IP address of the domain name (A resource records) to the DNS server by the home AAA or the Home Agent (HA) for the mobile station. An application on the network can resolve this domain name to the IP address to provide a service (like PUSH data) to the subscriber. It's a possibility that same NAI could be used on multiple mobiles; this will create a scenario where same domain name will be mapped to multiple IP addresses. This will result in multiple A resource records being returned to the Resolver on the client where application is resolving the domain name to the IP address. Most of the current applications/Resolver will pick up one of the IP addresses and unicast the data to it.

An example of an overall call setup 300 according to principles of the present invention is shown in FIG. 12. The overall call setup is shown in the environment of commercially successful CDMA 2000 infrastructure, made commercially available by the assignee of the present invention. Many of the elements shown are well known. Those elements introduced in the infrastructure according to principles of the present invention are identified with an asterisk (*).

The first query 302 is for A-type resource records from the client application 304. A conventional Resolver 306 forwards this query to DNS server 308. The query from the Resolver 306 to the DNS server is indicated at 310. Query responses 312, 314 from the DNS server 308 and Resolver 306, respectively, include an RR1 resource record.

MURR-type resource queries from the application 304 and Resolver 306 are indicated at 320, 322 and the corresponding responses are indicated at 324, 326.

The RR1 (Resource Record1) contains a MURR-type resource record for the MS1 to its IP address mapping. It is configured at HAAA/HA or conveyed by MS1 that multiple unicast is desired by MS1.

The RR2 (Resource Record2) contains an A type resource record for the MS2 to its IP address mapping. It is configured at HAAA/HA or conveyed by MS1 that multiple unicast is NOT desired by MS2.

As indicated in FIG. 12, a number of DNS updates are provided. The DNS updates for resource records are RR1–RR3 are indicated at 340–344.

FIG. 12 also includes a number of Registration/Accounting Start operations from mobile stations 1–3 indicated by 350–354. These are three mobile stations or mobile terminals for example a mobile phone, PDA etc. Out of these three mobile stations MS1 and MS3 desire multiple unicast, MS2 does not desire to receive multiple unicast destined for the domain name belonging to all three mobile stations.

The Registration/Accounting Start procedures are indicated at 362–366. In this step either the mobile sends registration request to the HA (Home agent), if it supports mobile IP or if it's a simple IP mobile an accounting start is sent to the home AAA. When HA or the HAAA receive these message they add an MURR type resource record to the DNS database for MS1 and MS3 and add an A type resource record for MS2. Whether MURR or A resource record will be added for a particular mobile will be conveyed by some means by the mobile itself.

The data from 304–350 and from 304–354 is the actual data such as stock quotes which the client application send to the Mobile hosts. As indicated in FIG. 12, the actual data such as stock quotes or weather alerts is sent from application 304 to mobile station 1 indicated at 350 and mobile station 3 indicated at 354, as indicated by 370, 372. When the data is sent from the application it is simultaneously sent (multiple unicast) to both MS1 and MS3 as they both desire multiple unicast but it's not sent to MS2 as it didn't desire multiple unicast.

The RR3 (Resource Record3) contains a MURR-type resource record for the MS3 to its IP address mapping. It is configured at HAAA/HA or conveyed by MS1 that multiple unicast is desired by MS3.

The R1 response (Response 1) to the A type query is sent from the Resolver. This response contains RR2 in the ANSWER SECTION of the response and RR1 and RR3 in the ADDITIONAL SECTION of the response. The Resolver forwards all these resource records to the client application. The client application, on seeing the MURR-type resource records for MS1 and MS3, responds by sending multiple unicast communications to both the devices whose IP addresses are mapped by the Domain Name.

If the application sends a query for MURR-type resource records, then the R2 response (Response 2) is sent by the DNS server. The R2 response (Response 2) to the MURR-type query from the Resolver contains RR1 and RR3 in the ANSWER SECTION of the response. The Resolver forwards all these resource records to the client application. The client application, on seeing the MURR-type resource records for MS1 and MS3, responds by sending multiple unicast communications to both the devices whose IP addresses are mapped by the Domain name.

Although the present invention has found immediate commercial application in the field of wireless communication systems, it should be understood that the present invention could be used in virtually any network situation where multiple hosts having the same domain name need to get the same treatment from a client application which communicates with the hosts using their IP addresses as resolved by a DNS server. Included, for example, are both wireless and wired systems, systems employing the Internet, intranets as well as local networks.

While the principles of the invention have been described above in connection with a specific apparatus, it is to be clearly understood that this description is made only by way of example and not as a limitation on the scope of the invention.

What is claimed is:

1. A method of multiple unicast communications between a requesting party and a plurality of hosts having different IP addresses mapped to a common domain name, comprising the steps of:
   obtaining the IP address of each host mapped to the domain name;
   providing a resource record
   storing the IP addresses obtained in the resource record
   providing an IP address accessing the resource record;
   accessing the resource record by the requesting party;
   the domain name server providing the requesting party with the IP addresses of the plurality of hosts having different IP addresses manned to a common domain name in response to the accessing of the resource record by the requesting party; and
   providing an indication to the requesting party for simultaneously sending multiple unicast messages to the plurality of hosts having different IP addresses mapped to a common domain name.

2. The method of claim 1 wherein the step of providing a resource record comprises the step of providing an a MURR-type resource record which includes the domain name to which the host IP addresses are mapped, a resource record type, a resource class code, a TTL defined bit interval, the length of a data field, and the data field containing an addressable location of at least one host.

3. The method of claim 2 wherein the addressable location of said at least one host comprises an Internet Protocol (IP) address.

4. The method according to claim 3 wherein the IP address comprises a 32-bit IPv4 address.

5. The method according to claim 3 wherein the IP address comprises a 128-bit IPv6 address.

6. The method according to claim 5 further comprising the step of providing a MURR response to the MURR query, containing a header field identifying the communication as a response, a question field containing the domain name to which the hosts addresses are mapped, and an answer field containing the addressable locations of each host mapped to the domain name.

7. The method according to claim 6 wherein the addressable locations for the hosts comprises 32-bit IPv4 addresses.

8. The method according to claim 6 wherein the addressable locations comprise 128-bit IPv6 addresses.

9. The method of claim 1 further comprising the steps of providing a base station controller coupled to a plurality of base transceiver stations which cooperate with a mobile station to form a wireless telecommunication system, with the mobile station containing the hosts whose IP addresses are mapped to the common domain name and with the resource record stored in the base station controller.

10. A The method of claim 9 wherein at least some of said hosts are mobile and said wireless telecommunication system provides communication to said mobile hosts.

11. The method according to claim 9 wherein said hosts are non-mobile and said wireless telecommunication system provides communication to said non-mobile hosts.

12. An arrangement for multiple unicast communications between a requesting party and a plurality of hosts having different IP addresses mapped a common domain name, comprising:
   a storage medium accessible by a domain name server, said storage medium containing a plurality of A-type resource records and a plurality of MURR-type resource records;
   providing an IP address of the domain name server for accessing the resource records;
   the domain name server responding to an A-record query with an additional section and with a plurality of MURR-type resource records indicating that the different IP addresses stored in the additional section are mapped to a common domain name and are destination addresses for multiple unicast communications; and
   providing an indication to the requesting party for simultaneously sending multiple unicast messages to the plurality of hosts having different IP addresses mapped to a common domain name.

13. The arrangement of claim 12 wherein the resource record comprises a MURR-type resource record which includes the domain name to which the host IP addresses are mapped, a resource record type, a resource class code, a TTL defined bit interval, the length of a data field, and the data field containing an addressable location of at least one host.

14. The arrangement of claim 12 wherein the resource record comprises a MURR query containing a header identifying that the communication comprises a query, and a question field containing the domain name to which the hosts are mapped.

15. The arrangement of claim 14 wherein the resource record further comprises a MURR response to the MURR query, containing a header field identifying the communication as a response, a question field containing the domain name to which the hosts addresses are mapped, and an answer field containing the addressable locations of each host mapped to the domain name.

16. The arrangement of claim 12 further comprising a base station controller coupled to a plurality of base transceiver stations which cooperate with a mobile station to form a wireless telecommunication system for communicating the resource IP address, with the mobile station containing the hosts whose IP addresses are mapped to the common domain name and with the resource record stored in the base station controller.

17. The arrangement of claim 12 further comprising a non-mobile wireless telecommunication system for communicating the IP address.

18. The arrangement of claim 12 further comprising a wired telecommunication system for communicating the IP address.

* * * * *

UNITED STATES PATENT AND TRADEMARK OFFICE
CERTIFICATE OF CORRECTION

PATENT NO.    : 6,766,379 B2
DATED         : July 20, 2004
INVENTOR(S)   : Mukesh Bhatla It is certified that error appears in the above-identified patent and that said Letters Patent is hereby corrected as shown below:

Column 9,
Line 35, change "manned" to -- mapped --;
Line 43, after "providing", delete "an";

Column 10,
Line 8, before "The", delete "A"; and
Line 16, after "mapped" insert -- to --.

Signed and Sealed this

Twenty-sixth Day of October, 2004

JON W. DUDAS
*Director of the United States Patent and Trademark Office*